US005589644A

United States Patent [19]

Becker et al.

[11] Patent Number: 5,589,644

[45] Date of Patent: Dec. 31, 1996

[54] TORQUE-ANGLE WRENCH

[75] Inventors: Thomas P. Becker; Matthew M. Crass, both of Kenosha; Gordon A. Putney, Lake Geneva; Randy J. Niesen, Kenosha; Dean J. Iwinski, Muskego, all of Wis.

[73] Assignee: Snap-on Technologies, Inc., Crystal Lake, Ill.

[21] Appl. No.: 347,871

[22] Filed: Dec. 1, 1994

[51] Int. Cl.[6] .......... G01L 5/00

[52] U.S. Cl. .......... 73/862.23; 73/862.21

[58] Field of Search .......... 73/862.23, 862.24, 73/862.21, 504.04, 504.12

[56] References Cited

U.S. PATENT DOCUMENTS 3,813,933 6/1974 Weiss et al. .
3,969,810 7/1976 Pagano .
3,969,960 7/1976 Pagano .
4,073,187 2/1978 Avdeef .
4,091,664 5/1978 Zerver .
4,125,016 11/1978 Lehoczky et al. .
4,171,647 10/1979 Herrgen .
4,257,263 3/1981 Herrgen .
4,262,528 4/1981 Holting et al. .......... 73/862.23
4,265,109 5/1981 Hallbauer et al. .
4,397,196 8/1983 Lemelson .
4,497,197 2/1985 Giardino et al. .
4,608,872 9/1986 Mayer et al. .
4,643,030 2/1987 Becker et al. .
4,679,029 7/1987 Krohn et al. .
4,685,050 8/1987 Polzer et al. .
4,709,182 11/1987 Wenske et al. .
4,760,746 8/1988 Kruse et al. .
4,845,998 7/1989 DeMartelaere et al. .
5,058,439 10/1991 Carpenter .
5,115,701 5/1992 Lehnert .
5,220,833 6/1993 Nakamura .......... 73/504.12
5,349,858 9/1994 Nakamura .......... 73/504.12
5,412,204 5/1995 Nakamura .......... 73/504.12

OTHER PUBLICATIONS

Gyrostar Piezoelectric Vibrating Gyroscope, Murata Erie N.A., Catalog No. G–09–A, copyright 1992.

Intersil–GE, Product Specification Manual, Description of ICM7208: 7–Digit LED Display Counter, pp. 14–19 to 14–75.

Linear Integrated Circuits—Product Spec. Manual, Raytheon RC4153, 4153A Voltage–to–Frequency Converter, pp. 9–14 to 9–26.

"Murata Offers a Piezoelectric Gyroscope", Ward's Engine Update, Jun. 15, 1990, p. 6.

*Primary Examiner*—Richard Chilcot
*Assistant Examiner*—Ronald Biegel
*Attorney, Agent, or Firm*—Emrich & Dithmar

[57] ABSTRACT

A torque-angle wrench is provided with a handle for applying torque, such as to a fastener or bolt, through a tightening angle, at a rotational angular velocity. A piezoelectric gyroscopic sensor device including circuitry for vibrating an oscillating body is coupled to the wrench. As the wrench is rotated through the tightening angle, its rotational angular velocity causes the vibrating body to alter its direction of vibration. The new vibrating pattern is sensed and converted, by appropriate sensing circuitry, into an electrical signal proportional in intensity to the rotational angular velocity of the wrench. The electrical signal can be electronically processed by appropriate conversion and display circuitry to provide a visual indication of the tightening angle. Such conversion and display circuitry can be integral with the wrench or as part of an adaptably coupled meter non-integrally connected to the sensor device.

15 Claims, 2 Drawing Sheets

30
PIEZO SENSOR
40
T2
T3
LEVEL SHIFTER
50
VOLT.-FREQ. CONV.
60
TOTALIZER CIRCUIT
70
S1
DISPLAY
80

PIEZO SENSOR
T5 T4 T3 T2 T1
V1
R1
R2
R3
R4
R5
R6
IC1
V2
C1
IC2
R8
-V2
C2
C3
R7
R10
R9
Q1
R11
R12
IC3
C4
R13
R14
S1
R15
V1'
C7
C8
VOLT. REG.2

S2
D1
C5
VOLT. REG.1
C6
VOLT. CONV.
90

TORQUE-ANGLE WRENCH

BACKGROUND OF THE INVENTION

1. Field of the Invention

The present invention relates generally to the field of torque-angle wrenches and, more particularly, to a torque-angle wrench including a piezoelectric gyroscopic sensor to measure the tightening angle.

2. Description of the Prior Art

The object of wrenching tools is to rotate or hold against rotation an item, such as a threaded fastener joining two objects together. There is a relationship between the amount of torque that is applied to the head of a fastener and the amount of load applied to the joined objects. A torque wrench takes advantage of this relationship by measuring the torque applied as an indication of the joining force or load.

Torque is considerably influenced by friction forces, the condition of the head, the amount, if any, of lubrication, as well as by other factors. Accordingly, the reliability of a torque measurement as an indication of desired load is significantly variable. For this reason, a torque-angle fastener installation process, rather than torque measurement alone, is recommended in situations where tightening to recommended specifications is critical.

In a torque-angle fastener installation, a fastener is first tightened to a desired torque using a torque wrench; then the fastener is rotated through a predetermined additional angle of rotation. It is well understood in the industry, that the amount of load that a fastener applies in squeezing two objects together is more closely related to stretch or elongation of the fastener than it is to the torque applied, since friction forces, lubrication, and other factors have considerably less influence on the stretch of the thread as measured by the angle of rotation of the thread with a known pitch than they do on the torque applied. Because angle-based torquing is a more accurate way to ensure even tightening, more and more manufacturers are using the torque-angle procedure for tightening fasteners. Another advantage of torque-angle installation is that like fasteners exert the same clamp forces without deviation from one fastener to the next because of variable conditions of lubrication, surface finish and the like.

At present, there are various wrenching tools available which meter angular rotation. Early angle measurement wrenching tools relied on some type of mechanical reference, usually a flexible strap connected to a "ground" clamp, for measurement of the angular rotation of a fastener.

More modern tools now use gyroscopes to meter angular rotation. One such device is disclosed in U.S. Pat. No. 4,262,528 to Hölting et al. A gyroscope operates by offering opposition to a swiveling motion around an axis located transversely to its axis of rotation. The Hölting gyroscopic wrench includes a gyroscope rigidly connected to a blade element interposed between a set of coils. The gyroscope has a rotor which defines the spin axis of the gyroscope. The gyroscope is mounted onto the tool via a support member in a manner which permits directional changes of the spin axis orientation from an initial orientation, due to precession of the rotor during rotation of the tool through the tightening angle. An electrical signal representative of the magnitude of rotor precession is generated by a sensor. The signal is then fed to a device which operates to return the gyroscope to its starting (neutral) position. The current intensity of the signal is proportional to the gyroscopic motion which occurs at the gyroscope support member, at a predetermined angular velocity around the pivoting axis. Accordingly, the signal, integrated by an appropriate integration circuit, is proportional to the tightening angle of the wrench about the axis of fastener rotation. The integrated signal thus provides a visual indication of the angle of wrench rotation.

Gyroscopic devices have gained in popularity over the years despite their non-negligible power consumption and the bulkiness of their respective housing units, in each of which is mounted a spinning gyroscope, a rotor, as well as appropriate integration and signal amplifying circuitry. The fact that gyroscopic units do not require a flexible 'ground' or 'reference' strap also is believed to have contributed to their popularity. However, high power consumption, a bulky construction, high manufacturing costs, and the need for greater accuracy has many scientists and engineers striving to come up with a better, more efficient torque-angle wrench.

The use of piezoelectric elements to perform torque measurements is well known. However, piezoelectric gyroscopic elements have never been used to measure 'rotation' of a fastener during a torquing operation.

SUMMARY OF THE INVENTION

It is a general object of the invention to provide a torque-angle wrench which is economical, highly accurate, and easy to manufacture.

It is another object of the present invention to provide a torque-angle wrench which is strapless.

It is another object of the present invention to provide a torque-angle wrench which has low power consumption, is less bulky than conventional tools which use a spinning gyroscope, and also accurate and more durable.

These and other features of the invention are attained by providing a torque-angle wrench with a handle for applying torque, such as to a fastener, through a tightening angle, at a rotational angular velocity. A piezoelectric gyroscopic sensor device including circuitry for vibrating an oscillating body is coupled to the wrench. As the wrench is rotated through the tightening angle, its rotational angular velocity causes the vibrating body to alter its direction of vibration. The new vibrating pattern is sensed and converted, by appropriate sensing circuitry, into an electrical signal proportional in intensity to the rotational angular velocity of the handle.

The electrical signal can be electronically processed by appropriate conversion and display circuitry to provide a visual indication of the tightening angle. Such conversion and display circuitry can be integrally confined within a self-contained torque-angle wrench tool or, alternatively, as part of an adaptably coupled meter usable with a torque/angle adapter which connects to a breaker bar or other suitable tool handle.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
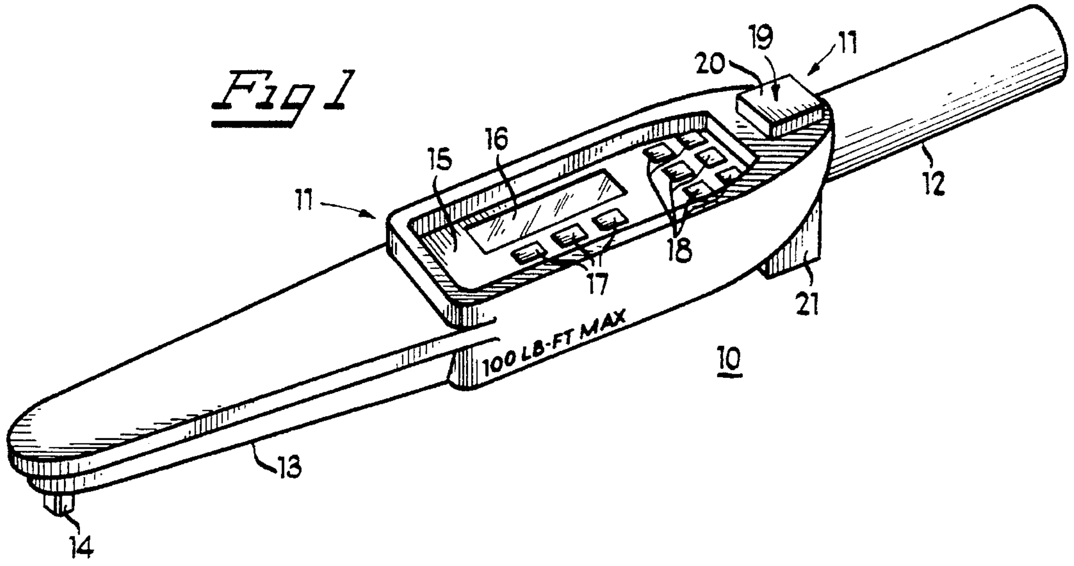
FIG. 1 is a perspective view of a self-contained torque-angle wrench for tightening a fastener, including an electronic housing unit containing electronic circuit logic, and a display for indicating such variables as torque and rotation angle.

In FIG. 1 is shown a torque-angle wrench 10 in the form of a torque wrench defined by an elongated housing 11, including a tubular gripping portion 12 at one end, made of steel, aluminum, or other suitable rigid material, a forward extending portion 13 containing a wrench head 14 pivotally supported at the working end of housing 11, and an electronic housing unit 15 which contains the electronics and display component to be described below. Wrench head 14 is shaped to slidably engage a socket (not shown) which is to be used to tighten the head of a bolt or a nut.

The torque-angle wrench 10 is shown, by way of example, as being capable of providing a maximum torque of 100 lb-ft. The present invention is easily adaptable to operate with any like wrench regardless of its designed maximum torque capacity. The electronic housing unit 15 is shown provided on the outside thereof with a display window 16, but may comprise instead light emitting diodes or other type of character indicating display, adapted to respond to the signals presented thereto by the underlying display circuitry to be discussed below. Also included are selection keys or buttons 17 and 18, each performing a unique function in cooperation with the electronic circuit and display components in electronic housing unit 15.

A vertical post 19, characterized by top and bottom ends 20 and 21, respectively, houses a piezoelectric sensor 40. Vertical post 19 is shown extending from a distal end portion of housing unit 15, but sensor 40 may be generally positioned anywhere along housing 11 between wrench head 14 and gripping portion 12.

Figures 2, 3, 4:
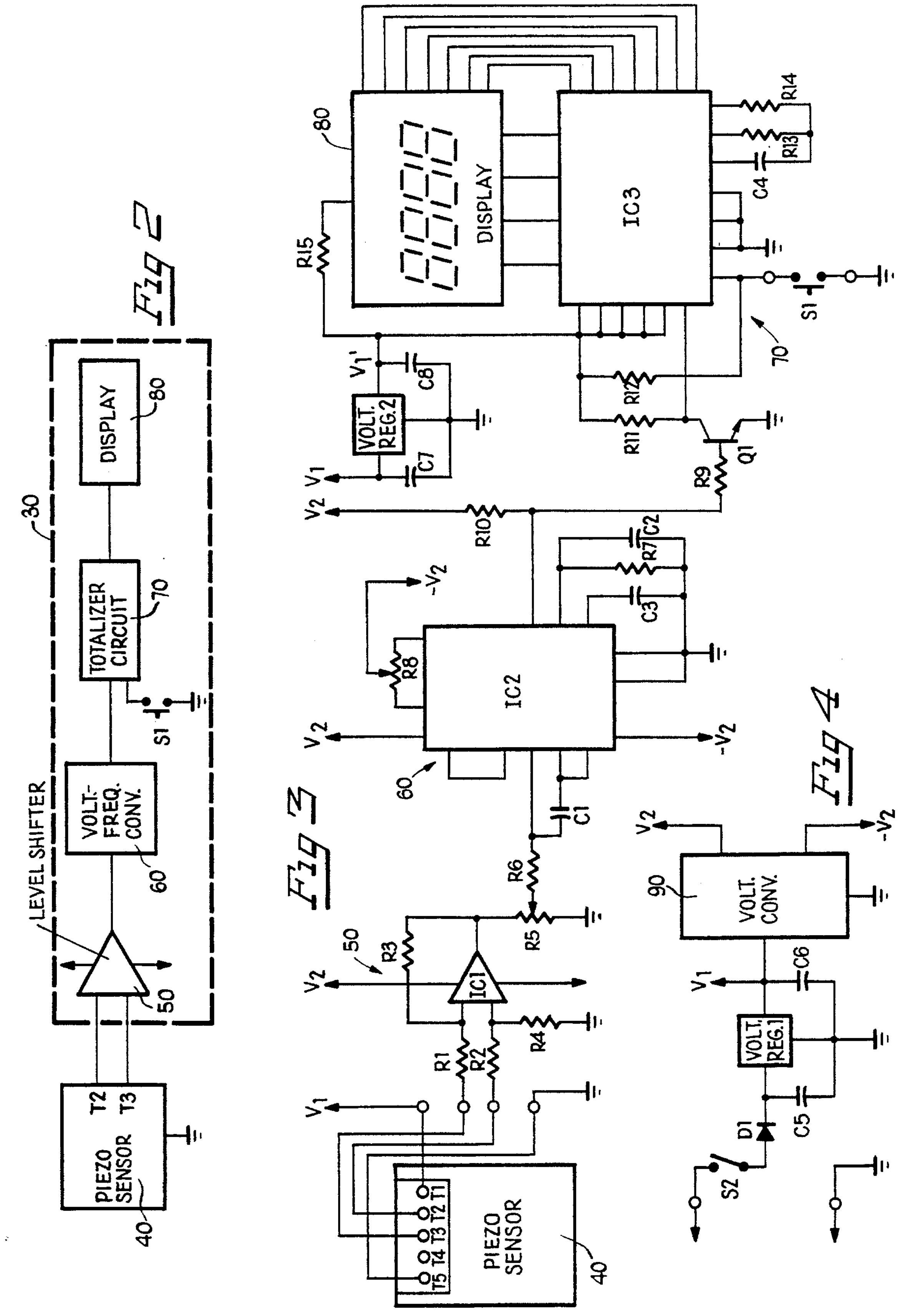
FIG. 2 is a functional block diagram illustrating the electronic circuits and components of the torque-angle wrench of FIG. 1.
FIG. 3 is a detailed schematic diagram of the electronic circuits and components shown in FIG. 2.
FIG. 4 is a schematic diagram of the power supply components of the present invention.

Housing unit 15 houses an angle integration logic circuitry 30 which in turn is electrically coupled to the piezoelectric sensor 40, as shown more clearly in FIG. 2. Angle integration logic circuitry 30 consists essentially of four sections, namely level shifter 50, voltage-to-frequency converter 60, totalizer circuit 70 and display logic 80. These sections cooperate with piezoelectric sensor 40, to sense and act on any rotational movement of housing 11 relative to a longitudinal axis of pivotally supported wrench head 14—such as during an angle torquing operation.

In the constructional embodiment herein disclosed, sensor 40 is a Gyrostar™ piezoelectric vibrating gyroscope of the type made commercially available by Murata Erie North America under Catalog No. G-09-A. Referring to FIG. 3, the Gyrostar™ piezoelectric sensor 40 includes five terminals, shown numbered as T1 to T5. Terminal T1 is a voltage input terminal—input power requirements being between 8 and 13.5 volts DC@15 milliamps maximum. Terminal T2 is the first of two available output terminals, its signal varying from 2.5 (±10 mV) volts at rest, i.e., zero-degree rotation, to between 0.5 volts counterclockwise, and 4.5 volts clockwise (±60 mV) at a maximum rotational rate of 90 degrees per second (the output being linear from rest to maximum rotational rate). Terminal T3 is the second output terminal, providing a steady 2.5 volt reference signal to the level shifter 50. Terminal T4 is a diagnostic output (not used) and T5 is circuit common.

The operating outputs from Gyrostar™ piezoelectric sensor 40, terminals T2 and T3, are fed to angle integration logic circuitry 30 and, more particularly, to level shifter 50 which consists of resistors R1–R4 and instrumentation amplifiers IC1. Terminal T2 is connected to one end of resistor R2 while terminal T3 is connected to one end of resistor R1. The other ends of resistors R1 and R2 are connected directly to the inputs of amplifier IC1. Amplifier IC1 is used in differential mode to shift the output of Gyrostar™ piezoelectric sensor 40 to circuit common ('zero' volts). Resistors R1 through R4 establish a gain of one at the output of level shifter 50.

The output of level shifter 50 is then applied to a (10KΩ) potentiometer R5 which is used to adjust the input gain of voltage-to-frequency converter IC2 via resistor R6 and capacitor C1. In a constructional embodiment, 240KΩ resistors were chosen for each of resistors R1 to R4. In the same constructional embodiment, IC2 is an RC4153 integrated circuit, commercially available from Raytheon, and configured to operate in a precision Voltage-to-Frequency Converter mode, as prescribed in Linear Integrated Circuits, Products Specification Manual, pp. 9–14 to 9–26. In accordance therewith, capacitor C1 (3300 pF) provides stability to the input circuit of IC2, while capacitor C2 (0.01 μF) and resistor R7 (20KΩ) establish input circuit biasing. Capacitor C3 (0.1 μF) is chosen in conjunction with the values of capacitor C1 and resistor R6 (20KΩ) to establish maximum output frequency. Resistor R8 (10KΩ) provides ZERO balance adjustment.

The output of IC2 is a narrow pulse train whose frequency is a function of the input voltage from level shifter 50. Each pulse is negative going to circuit common and coupled to the base of inverter transistor Q1 through resistor R9 (10KΩ) of totalizer circuit 70. Resistor R10 (5.1KΩ) is connected to the output of IC2 and serves as a pull-up load resistor, since the output of IC2 is open collector.

The pulse train output from voltage-to-frequency converter IC2 is applied to totalizer circuit 70 where, it becomes inverted by inverter Q1, and the output therefrom input to a digital counter IC3. Counter IC3 is at the heart of totalizer circuit 70, adding the pulses input thereto to drive an LED display 80. Once again, in the preferred constructional embodiment, IC3 is an ICM7208IP1 integrated circuit digital counter commercially available from Intersil.

The operating conditions of counter IC3 are established by selecting appropriate values for bias resistor R11 (4.7KΩ) and pull-up resistor R12 (4.7KΩ), as well as for capacitor C4 (0.01 μF), resistor R13 (100KΩ) and resistor R14 (100KΩ), the latter three setting an appropriate display multiplex rate. Resistor R12 is a pull-up resistor for reset switch S1. Resistor R15 limits current to display 80 and provides a select input for the tenths digit decimal point.

Torque-angle wrench 10 is intended to be powered by a chemical battery (not shown). Referring to FIG. 4, in the preferred embodiment, a voltage source (12V) is regulated to V1(10V) through polarity reversal protection diode D1 and voltage regulator VR1. Capacitors C5 (0.22 μF) and C6 (10 μF) filter and stabilize voltage regulator VR1. Voltage Regulator VR1 outputs power to the Gyrostar™ piezoelectric sensor 40. It also supplies power to totalizer circuit 70, which is further powered through voltage regulator VR2, which in turn generates voltage V1' (5V). Capacitors C7 (0.22 μF) and C8 (10 μF) filter and stabilize voltage regulator VR2.

The output of voltage regulator VR1 is supplied to voltage converter 90 employed to provide positive V2 (15V) and negative −V2 (−15V) supplies for IC1 and IC2 in FIG. 3.

In operation, the torque-angle wrench 10 of the present invention is initially oriented at a first position for pivotal rotation about the longitudinal axis of the fastener to which a torque is to be applied, measured as a function of angular rotation. Tightening angle specifications are generally predetermined variables, usually established by the manufacturer and applied by the wrench user, with wrench 10 providing a digital read-out of the degrees of rotation from the initial orientation.

Unlike gyroscopes which are set in spinning motion prior to use for angular rotation, the Gyrostar™ piezoelectric sensor 40 includes a moving element (not shown), which is an equilateral prism-shaped vibrating body. One set of piezoelectric ceramic plates attached to respective sides of the vibrating body are initially excited by an alternating current causing the sensor 40 to bend back and forth in one plane through the center of the vibrating body perpendicular to the plane. As the torque-angle wrench 10 is rotated in either a clockwise or counterclockwise direction away from its initial orientation, exerting a torque on the fastener, the vibrating body begins to bend off the initial plane of rotation producing a Coriolis force, sensed by a second set of the piezoelectric ceramic plates, that is converted into an electrical signal. Characteristic of the Gyrostar™ piezoelectric sensor 40, the electrical signal is a function of the angular velocity of the rotating torque-angle wrench 10. The electrical signal from the Gyrostar™ piezoelectric sensor 40 is supplied to level shifter 50 which references this signal to circuit common from its original reference of 2.5V above circuit common.

To convert the output from level shifter 50 into a display of degrees of rotation, it is first fed to the voltage-to-frequency converter 60. The actual frequency rate per input volts is calibrated by adjusting potentiometer R5. The output frequency from voltage-to-frequency converter 60 is then fed directly into totalizer circuit 70 which accumulates the pulses, while at the same time, via display 80, digitally displays a running total as degrees of rotation.

The reset switch S1, coupled to totalizer circuit 70, is used to disable totalizer circuit operation during pre-load fastener installation. In practice, a torque measuring circuit is pre-set to a pre-load torque value. The display logic 80 is held reset (S1) until the torque preset is reached. Once switch S1 is released, display logic 80 and totalizer circuit 70 become operable to provide an angle display indicative of degrees of rotation, visually notifying operator when a specified angle for the particular fastener assembly is reached.

In the constructional embodiment, the preferred piezoelectric sensor 40 is a Gyrostar™ piezoelectric vibrating gyroscope sensor made by Murata Erie, which sensor is characterized by a vibrating body comprised of an electrically excitable vibrating prism having a piezoelectric ceramic sensor plate mounted on each of three sides. It is envisioned, however, that any piezoelectric type sensor capable of generating an electrical signal, representative of angular movement of a rotating body, is an equivalent and can be substituted for the Gyrostar™ herein disclosed.

Furthermore, while the preferred embodiment uses a totalizer circuit 70 to accumulate the pulses from the voltage-to-frequency converter 60, it is foreseeable that a presettable counter or the like can be used instead, in cooperation with which, an alarm signal may serve as an audible indication that a predetermined number of degrees of rotation has been reached. The preset would be user adjustable.

In another alternative configuration, the totalizer circuit 70 (or presettable counter) could be held in a state of reset during the torque portion of the fastener installation. At a torque preset level, the counter would then begin monitoring degrees of rotation providing an appropriate real time display and/or when the tightening angle preset level is reached, set off an alarm. Consequently, both torque preload and tightening angle would be preset by the user and a single stroke of the wrench would monitor, and display, first torque level and then degrees of rotation, at least until respective maximum preset levels.

Figure 5:
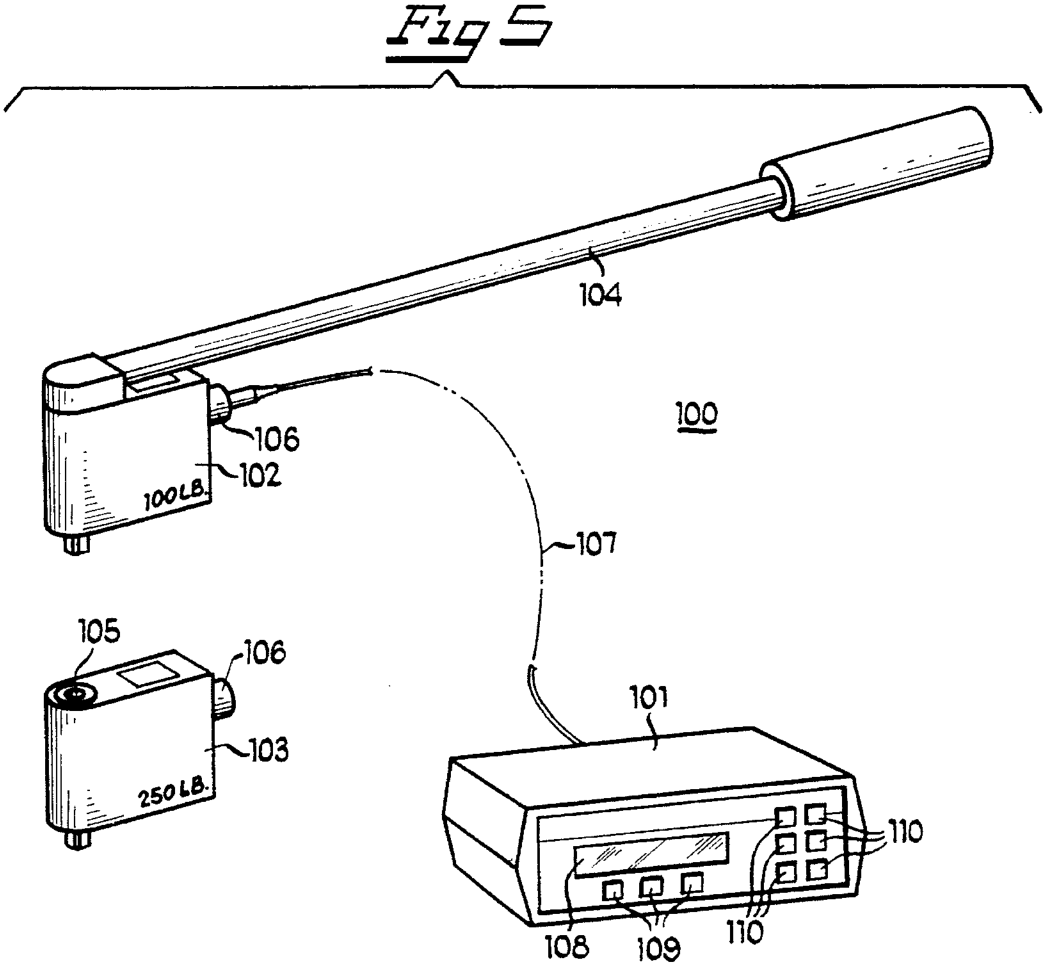
FIG. 5 is a perspective view of a torque-angle wrench in accordance with a second preferred embodiment, showing a multi-sensor system consisting of a series of torque/angle adapters for use with a common breaker bar and a common display/control unit.

FIG. 5 shows a torque-angle wrench 10 constructed in accordance with a second preferred embodiment. Wrench 100 is a multi-sensor system consisting of a common display/control unit 101 and a series of torque-angle adapters 102, 103 for use with a breaker bar 104. Adapters 102 and 103 are each constructed to impart a predetermined maximum torque (shown, by way of example, as 100 lb-ft and 250 lb-ft, respectively) during fastener installation. In the constructional embodiment of FIG. 5, housed in each of adapters 102 and 103 is a Gyrostar™ piezoelectric sensor 40, which in the previously described manner, generates an electrical signal representative of angular velocity of breaker bar 104, through a tightening angle, during fastener installation. Adapters 102, 103 each include a cavity 105 for slidably engaging a male post (not shown) formed integral with breaker bar 104. Also included with each adapter 102, 103 is an adapter plug 106, from which is intended to be transmitted electrical signals to unit 101, via electrical adapter cable 107. Display/control unit 101 houses all the angle integration logic circuitry 30 shown in FIG. 1, with the exception of the Gyrostar™ piezoelectric sensor 40, which sensor 40 is individually housed in each of the respective adapters 102, 103. A display window 108 and selector keys 109 and 110 are also provided substantially as in the first preferred embodiment shown and described in connection with the self-contained torque-angle wrench shown in FIG. 1.

It should now be readily apparent that the use of a piezoelectric sensor 40 to meter angular rotation obviates the need for ground reference straps, and the like, necessary in non-gyroscopic type torque-angle wrenches.

Furthermore, use of a piezoelectric vibrating gyroscopic sensor 40 in a torque-angle wrench capable of angle metering, overcomes the complexity of conventional 'spinning' gyro mechanisms, thus making commercially viable the use thereof within a self-contained torque-angle wrench provided with visual display and reset/preset components, as described above.

Although the angle integration logic circuitry 30 described above, in connection with the above preferred embodiments, is shown implemented by hardware circuits, it should be readily understood that a microcontroller with associated software programming could also be substituted therefor to perform the identical function.

It should also be readily understood with respect to the circuit diagrams, that while suitable electrical energy is described provided by a battery supported by the wrench tool, it may, alternatively, be provided by an external source connected to the tool circuits by a flexible cable for appropriately operating the various components and circuits described in the specification.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A torque-angle wrench comprising:

a handle for applying torque through a tightening angle at a rotational angular velocity;

a piezoelectric gyroscopic sensor, including a vibrating body responsive to rotation of said handle, for generating an electrical signal representative of the rotational angular velocity; and integrating means for converting said electrical signal into an output signal representing degrees of rotation of said handle, said integrating means including a voltage to frequency converter and a totalizer circuit, said electrical signal being converted to a digital pulse signal by said voltage to frequency converter and said digital pulse signal being fed directly to said totalizer circuit which, on the basis of said digital pulse signal, generates said output signal.

2. The wrench of claim 1, wherein said integrating means further includes display means coupled to said totalizer circuit and responsive to said output signal for displaying the degree of rotation of said handle.

3. The wrench of claim 1, wherein said handle, said integrating means and said sensor are integrally constructed as part of a self-contained wrench.

4. The wrench of claim 1, wherein said integrating means further includes means for presetting the wrench to a predetermined torque level.

5. The wrench of claim 1, wherein the vibrating body is an electrically excitable vibrating prism having a piezoelectric ceramic sensor plate mounted on each of three sides.

6. A torque-angle wrench comprising:

a handle for applying torque through a tightening angle at a rotational angular velocity;

a piezoelectric gyroscopic sensor, including a vibrating body responsive to rotation of said handle, for generating an electrical signal representative of the rotational angular velocity; and means for presetting the tightening angle to a predetermined level.

7. A torque-angle wrench comprising:

a handle for applying torque through a tightening angle at a rotational angular velocity;

a piezoelectric gyroscopic sensor, including a vibrating body responsive to rotation of said handle, for generating an electrical signal representative of the rotational angular velocity;

means for converting said electrical signal into a digital pulse signal corresponding to degrees of rotation of said handle; and means for counting said pulses and setting off an alarm when a predetermined number of pulses are accumulated.

8. A torque-angle wrench system comprising:

a handle for applying torque through a tightening angle at a rotational angular velocity; and a set of torque-applying adapter units each adapted for use with said handle, each said adapter unit including a piezoelectric gyroscopic sensor, including a vibrating body responsive to rotation of said handle for generating an electrical signal representative of the rotational angular velocity.

9. The system of claim 8, further comprising a display/control unit including integrating means for converting said electrical signal into an output signal representing degrees of rotation of said tool handle.

10. The system of claim 9, wherein said integrating means includes a voltage to frequency converter and a totalizer circuit, said electrical signal being converted to a digital pulse signal by said voltage to frequency converter and said digital pulse signal fed directly to said totalizer circuit which, on the basis of said digital pulse signal, generates said output signal.

11. The system of claim 10, wherein said integrating means further includes display means coupled to said totalizer circuit and responsive to said output signal for displaying the degrees of rotation of said tool handle.

12. The system of claim 9, wherein said display/control unit comprises:

means for converting said electrical signal into a digital pulse signal corresponding to degrees of rotation of said tool handle; and means for counting said pulses and setting off an alarm when a predetermined number of pulses are accumulated.

13. The system of claim 11, wherein said display means includes means for presetting the tightening angle to a predetermined level.

14. The system of claim 13, wherein said display means further includes means for presetting the torque applied to a predetermined torque level.

15. The system of claim 8, wherein the vibrating body is an electrically excitable vibrating prism having a piezoelectric ceramic sensor plate mounted on each of three sides.

* * * * *

US005589644C1

(12) EX PARTE REEXAMINATION CERTIFICATE (6003rd)

United States Patent

(10) Number: US 5,589,644 C1

(45) Certificate Issued: Nov. 13, 2007

Becker et al.

(54) TORQUE-ANGLE WRENCH

(75) Inventors: Thomas P. Becker, Kenosha, WI (US); Matthew M. Crass, Kenosha, WI (US); Gordon A. Putney, Lake Geneva, WI (US); Randy J. Niesen, Kenosha, WI (US); Dean J. Iwinski, Muskego, WI (US)

(73) Assignee: Snap-on Technologies, Inc., Crystal Lake, IL (US)

Reexamination Request:

No. 90/007,388, Jan. 20, 2005

Reexamination Certificate for:

Patent No.: 5,589,644

Issued: Dec. 31, 1996

Appl. No.: 08/347,871

Filed: Dec. 1, 1994

(51) Int. Cl.

*G01L 5/00* (2006.01)

(52) U.S. Cl. .................................. 73/862.23; 73/862.21

(58) Field of Classification Search ........................ None

See application file for complete search history.

(56) References Cited

U.S. PATENT DOCUMENTS

| | | | |
|---|---|---|---|
| 4,091,664 | A | 5/1978 | Zerver |
| 4,257,263 | A | 3/1981 | Herrgen |
| 4,262,528 | A | 4/1981 | Holting et al. |
| 4,489,609 | A | 12/1984 | Burdess et al. |
| 4,643,030 | A | 2/1987 | Becker et al. |
| 4,760,746 | A | 8/1988 | Kruse et al. |
| 4,845,998 | A | 7/1989 | DeMartelaere et al. |
| 5,220,833 | A | 6/1993 | Nakamura |
| 5,476,014 | A | 12/1995 | Lampe et al. |
| 5,493,166 | A | 2/1996 | Kasanami et al. |

FOREIGN PATENT DOCUMENTS

| | | |
|---|---|---|
| JP | 61181912 | 8/1986 |
| JP | 62088915 | 4/1987 |
| JP | 5107130 | 4/1993 |
| JP | 6121404 | 4/1994 |
| JP | 6137975 | 5/1994 |
| JP | 6167401 | 6/1994 |
| JP | 6319227 | 11/1994 |
| JP | 7128158 | 5/1995 |
| JP | 8197445 | 8/1996 |

OTHER PUBLICATIONS

Holger Clasen, Hamburg, "Schraub–Messtechnik," pp. 18 and 19 (1993).

Sony Radio Cassette Player WM–F2081 Operating Instructions; Sony Corporation, 1990.

SKIL Operating Guide for Circular Saws; SKIL Corporation, Chicago, Illinois, 1985.

GE Model 7–4612 Space Saver FM/AM Electronic Digital Clock Radio Use and Care Guide, 1988.

Thomas, Jr., George B., *Calculus and Analytic Geometry Fourth Edition*, pp. 143–147 and 160–171, Addison–Wesley Publishing Company, Dec. 1969.

Cerni, R.H. and Foster, L.E., *Instrumentation for Engineering Measurement*, pp. 180, 181, 200, John Wiley & Sons, Inc., New York, 1962.

Linear Integrated Circuits Product Spec. Manual, Raytheon RC4153, 4153A Voltage–to–Frequency Converter, pp. 9–14 to 9–18, 9–20 to 9–25.

Piezoelectric Vibrating Gyroscope, Murata Eric N.A., Catalog No. G–09–A, 1992.

*Primary Examiner*—Joseph R. Pokrzywa

(57) ABSTRACT

A torque-angle wrench is provided with a handle for applying torque, such as to a fastener or bolt, through a tightening angle, at a rotational angular velocity. A piezoelectric gyroscopic sensor device including circuitry for vibrating an oscillating body is coupled to the wrench. As the wrench is rotated through the tightening angle, its rotational angular velocity causes the vibrating body to alter its direction of vibration. The new vibrating pattern is sensed and converted, by appropriate sensing circuitry, into an electrical signal proportional in intensity to the rotational angular velocity of the wrench. The electrical signal can be electronically processed by appropriate conversion and display circuitry to provide a visual indication of the tightening angle. Such conversion and display circuitry can be integral with the wrench or as part of an adaptably coupled meter non-integrally connected to the sensor device.

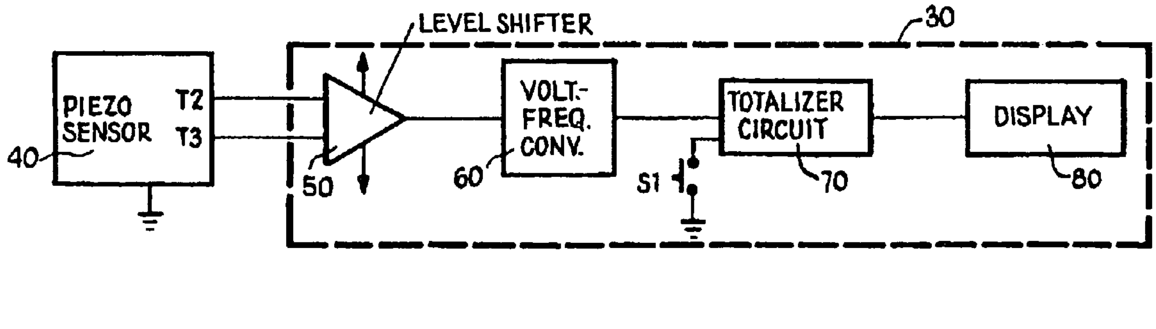

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–5 and 7 is confirmed.

Claim 6 is cancelled.

Claims 8–15 were not reexamined.

* * * * *